(12) United States Patent
Sicilia et al.

(10) Patent No.: US 6,780,003 B2
(45) Date of Patent: Aug. 24, 2004

(54) REMOVABLE HEATER FOR A HOT RUNNER NOZZLE

(75) Inventors: Robert Sicilia, Etobicoke (CA); Denis Babin, Georgetown (CA); Hans Guenther, Georgetown (CA)

(73) Assignee: Mold-Masters Limited (CA)

( * ) Notice: Subject to any disclaimer, the term of this patent is extended or adjusted under 35 U.S.C. 154(b) by 0 days.

(21) Appl. No.: 10/210,883

(22) Filed: Aug. 2, 2002

(65) Prior Publication Data

US 2004/0022891 A1 Feb. 5, 2004

(51) Int. Cl.[7] .............................................. B29C 45/20
(52) U.S. Cl. .................................. 425/549; 264/328.15
(58) Field of Search ....................... 425/549; 264/328.15

(56) References Cited

U.S. PATENT DOCUMENTS

| | | | |
|---|---|---|---|
| 3,849,630 A | 11/1974 | Halliday | |
| 4,268,241 A | 5/1981 | Rees et al. | |
| 4,451,974 A | 6/1984 | Gellert | |
| 4,940,870 A | 7/1990 | Shibata et al. | |
| 5,113,576 A | 5/1992 | van Boekel et al. | |
| 5,360,333 A | 11/1994 | Schmidt | |
| 5,411,392 A | 5/1995 | Von Buren | |
| 5,533,882 A | 7/1996 | Gessner et al. | |
| 5,879,727 A | * 3/1999 | Puri | 425/549 |
| 6,043,466 A | 3/2000 | Jenko et al. | |
| 6,163,016 A | 12/2000 | Johnson et al. | |
| 6,164,954 A | 12/2000 | Mortazavi et al. | |
| 6,220,851 B1 | 4/2001 | Jenko | |
| 6,309,207 B1 | 10/2001 | Kalemba | |
| 6,323,465 B1 | * 11/2001 | Gellert et al. | 425/549 |
| 6,343,925 B1 | 2/2002 | Jenko | |
| 6,409,497 B1 | 6/2002 | Wurstlin | |
| 6,609,902 B1 | * 8/2003 | Blais et al. | 425/549 |

FOREIGN PATENT DOCUMENTS

| | | |
|---|---|---|
| DE | 196 01 102 A1 | 7/1997 |
| EP | 0 724 943 A | 8/1996 |
| FR | 2 497 477 A | 7/1982 |
| GB | 2 044 162 A | 10/1980 |

OTHER PUBLICATIONS

Patent Abstracts of Japan, vol. 1996, No. 04, Apr. 30, 1996, JP 07 323442A (Niigata Eng. Co. Ltd.), Dec. 12, 1995.

* cited by examiner

Primary Examiner—Tim Heitbrink
(74) Attorney, Agent, or Firm—Sterne, Kessler, Goldstein & Fox P.L.L.C.

(57) ABSTRACT

A heater assembly for an injection molding apparatus comprises a heater sleeve having a threaded inner surface for engaging a threaded outer surface of a nozzle body of a nozzle or a threaded surface of a mold manifold. A clamping element such as a lock nut or a spring is provided adjacent the heater sleeve. The lock nut and/or the spring abuts the heater sleeve to force the threaded inner surface of the heater sleeve into contact with the threaded outer surface of the nozzle body. This removable clamped heater assembly operates regardless of the temperature of heater.

20 Claims, 15 Drawing Sheets

US 6,780,003 B2

REMOVABLE HEATER FOR A HOT RUNNER NOZZLE

FIELD OF THE INVENTION

The present invention relates generally to an injection molding apparatus and in particular to a removable heater for injection nozzles and manifolds.

BACKGROUND OF THE INVENTION

Heat generation and management of molten material in an injection molding apparatus is important for ensuring the production of high quality molded parts. Heating of the molten material is typically accomplished by locating several electrically powered heaters adjacent to the flow channel of the machine nozzle, the mold manifold and the hot runner nozzle. Several different types of electrical heaters are available including coil heaters, band heaters, film heaters, heat pipes, induction heaters and cartridge heaters. The heaters are sometimes integrated or embedded into the nozzle housing in order to optimize the heat transfer to the molten material. Integrated electrical heaters are more expensive to manufacture and typically cannot be replaced without replacing the entire nozzle.

It is often preferable to use removable heaters because they are less expensive to manufacture and can be replaced without replacing the entire nozzle. A disadvantage of the known removable heaters in injection molding is that achieving efficient heat transfer between the heater and the nozzle can be difficult. Because the heater is a separate component, gaps can occur between the heater and the nozzle or manifold, any gap between these components reduces the efficiency of the heat transfer. The amount of contact between the heater and the nozzle or manifold must therefore be maximized. As a result, clamping solutions have been developed. Ideally, an optimum heater clamp would provide a good heat transfer from the heater to the nozzle irrespective of the actual temperature of the heater clamp. An ideal clamped heater would operate perfectly in hot conditions and would continue to operate perfectly regardless of temperature changes or variations from higher temperatures to lower temperatures. This means that the temperature fluctuation of the heater would not affect the clamping force between the heater and the nozzle.

A further disadvantage of known removable heaters is that they often require additional space to accommodate a locking mechanism. This is a problem in high cavitation molding applications where the space between the adjacent nozzle is minimized.

Referring to FIG. 1, a prior art clamp comprising a cylindrical heating sleeve 4 is shown. The heating sleeve 4, which includes heating elements 5 embedded therein, surrounds a nozzle body 6 to transfer heat thereto. The heating sleeve 4 includes an axial gap that provides a spring like characteristic. A clamping mechanism 7 having a screw 8 is provided for tightening the heating sleeve 4 about the nozzle body 6. The heating sleeve 4 is installed and clamped around the nozzle body 6 when the nozzle body 6 is in the cold condition. During regular operation, heat expansion causes the nozzle body 6 and the heating sleeve 4 to expand radially, as indicated by arrows 9. When the injection molding apparatus is turned off, the heating sleeve 4 and nozzle body 6 should return to their original size. This continuous heating and cooling of the heating sleeve 4 and the nozzle body 6 causes the contact between the heating sleeve 4 and nozzle body 6 to be reduced over time. This reduces the heat transfer between the heating sleeve 4 and the nozzle body 6. Therefore, it is necessary to readjust the clamping mechanism 7 on a frequent basis.

Several attempts have been made in the prior art to address this problem. The prior art solutions include several different clamping devices for exerting a compressing force on the heater in order to maintain contact between the nozzle body and the heater.

U.S. Pat. No. 4,268,241 discloses a removable annular heating element that is maintained in position by a nut. The nut is threaded onto a threaded lower portion of the nozzle near the nozzle tip.

U.S. Pat. No. 4,940,870 teaches an induction heating element for hot runner nozzles that includes a clamping sleeve having axial slots of various lengths.

U.S. Pat. No. 6,043,466 discloses a clamping sleeve that surrounds a heater. The clamping sleeve has a lower coefficient of thermal expansion than the heater and therefore causes the heater to be compressed against the nozzle when heated. The clamping sleeve may also be preloaded to exert a compressing force on the heater in the cold state.

U.S. Pat. No. 6,163,016 discloses a removable heater that is surrounded by a clamp. A pair of collars at opposing ends of the clamp are provided to compress the heater against the nozzle body.

U.S. Pat. No. 6,409,497 discloses a jacket-heating unit for a nozzle. The heating unit is surrounded by a sleeve that is flexible in the radial direction. A circular lock surrounds the sleeve and is rotatable between a released position and a clamped position. The sleeve and the circular lock include facing surfaces that have profiles that deviate from that of a cylindrical shell.

Achieving full contact between smooth heater surfaces and smooth nozzle or manifold body surfaces having different expansion coefficients is a difficult task particularly when the temperature of the heater cycles between hot and cold temperatures. As a result, the clamping heater devices of the prior art tend to be complex and thermally less efficient than expected. In addition, some skill and additional time is typically required to properly install the prior art devices.

It is therefore an object of the present invention to provide a removable heater for an injection nozzle or tubular manifold, which obviates or mitigates at least one of the above disadvantages.

SUMMARY OF THE INVENTION

According to one aspect of the present invention there is provided an injection molding apparatus comprising:
 a manifold having a manifold channel for receiving a melt stream of moldable material under pressure, the manifold channel for delivering the melt stream to a nozzle channel of a nozzle;
 a mold cavity receiving the melt stream from the nozzle, the nozzle channel communicating with the mold cavity through a mold gate;
 a heater assembly provided on the nozzle for heating the melt stream of moldable material, the heater assembly having a threaded inner surface for engaging a threaded outer surface of the nozzle; and
 wherein heat is transferred from the heater assembly to the nozzle through contact between threads of the heater assembly and threads of the nozzle.

According to another aspect of the present invention there is provided a heater assembly for an injection molding apparatus, the heater assembly comprising:

a heater sleeve having a threaded inner surface for engaging a threaded outer surface of a nozzle body of a nozzle;

a lock nut located adjacent the heater sleeve, the lock nut for selectively engaging the threaded outer surface of the nozzle body; and wherein the lock nut abuts the heater sleeve and forces the threaded inner surface of the heater sleeve into contact with the threaded outer surface of the nozzle body independent of temperature variations of the heater sleeve.

According to yet another aspect of the present invention there is provided an injection nozzle comprising:

a nozzle body having a nozzle channel extending therethrough, the nozzle body having a first engaging surface having a first profile;

a heater provided on the nozzle body for heating the melt stream of moldable material, the heater having a second engaging surface having a second profile; and wherein the heater and the nozzle body are coupled together by the interaction of the first profile and the second profile.

According to still another aspect of the present invention there is provided an injection molding apparatus comprising:

a manifold having a manifold channel for receiving a melt stream of moldable material under pressure, the manifold channel for delivering the melt stream to a mold cavity;

an injection nozzle having a nozzle body and a nozzle channel, the nozzle body having a first engaging surface having a first profile;

a heater provided on the nozzle body for heating the melt stream of moldable material, the heater having a second engaging surface having a second profile; and wherein heat is transferred from the heater assembly to the nozzle through contact between the first profile and the second profile.

According to another aspect of the present invention there is, provided an injection molding apparatus comprising:

a manifold having a manifold channel for receiving a melt stream of moldable material under pressure, the manifold channel for delivering the melt stream to a nozzle channel of a nozzle;

a mold cavity receiving the melt stream from the nozzle, the nozzle channel communicating with the mold cavity through a mold gate; and wherein a heater assembly provided on the nozzle for heating the melt stream of moldable material, the heater assembly having a threaded inner surface for engaging a threaded outer surface of the nozzle.

According to another aspect of the present invention there is provided an injection molding apparatus comprising:

a manifold having a manifold channel for receiving a melt stream of moldable material under pressure, the manifold channel for delivering the melt stream to a nozzle channel of a nozzle;

a mold cavity receiving the melt stream from the nozzle, the nozzle channel communicating with the mold cavity through a mold gate;

a heater assembly provided on the nozzle for heating the melt stream of moldable material, the heater assembly having a threaded inner surface for engaging a threaded outer surface of the nozzle; and wherein contact is maintained between the threaded inner surface and the threaded outer surface independent of temperature.

According to still another aspect of the present invention there is provided an injection molding apparatus comprising:

a manifold having at least one tubular manifold shaft, the manifold shaft having a manifold channel for receiving a melt stream of moldable material under pressure, the manifold channel for delivering the melt stream to a nozzle channel of an injection nozzle;

a mold cavity receiving the melt stream from the nozzle, the nozzle channel communicating with the mold cavity through a mold gate; and a heater assembly provided on the manifold shaft for heating the melt stream of moldable material, the heater assembly having a threaded inner surface for engaging a threaded outer surface of the, manifold shaft.

According to another aspect of the present invention there is provided a method for removably clamping a heater to an injection nozzle comprising:

providing an injection nozzle having a threaded outer surface;

providing a heater assembly having a heater sleeve, the heater sleeve having a threaded inner surface;

clamping the heater assembly to the injection nozzle in a temperature independent molding condition.

According to another aspect of the present invention there is provided a method of assembling a heater in an injection molding apparatus comprising:

providing an injection nozzle having a threaded outer surface;

providing a heater assembly having a heater sleeve, the heater sleeve having a threaded inner surface; and threading the heater assembly onto the injection nozzle and generating a clamping force between the heater assembly and the injection nozzle to maximize the surface contact between the heater assembly and injection nozzle.

The present invention provides advantages in that the heater assembly is relatively easy to install and remove while the injection nozzle is in communication with the manifold. In addition, the contact between the threaded heater sleeve and the threaded nozzle body enables efficient heat transfer to occur. Furthermore, the clamping force between the heater assembly and the nozzle, or manifold, is, maintained regardless of the temperature of the heater assembly.

BRIEF DESCRIPTION OF THE DRAWINGS

Embodiments of the present invention will now be described more fully with reference to the accompanying drawings in which.

DETAILED DESCRIPTION OF THE PREFERRED EMBODIMENT

Figure 1:
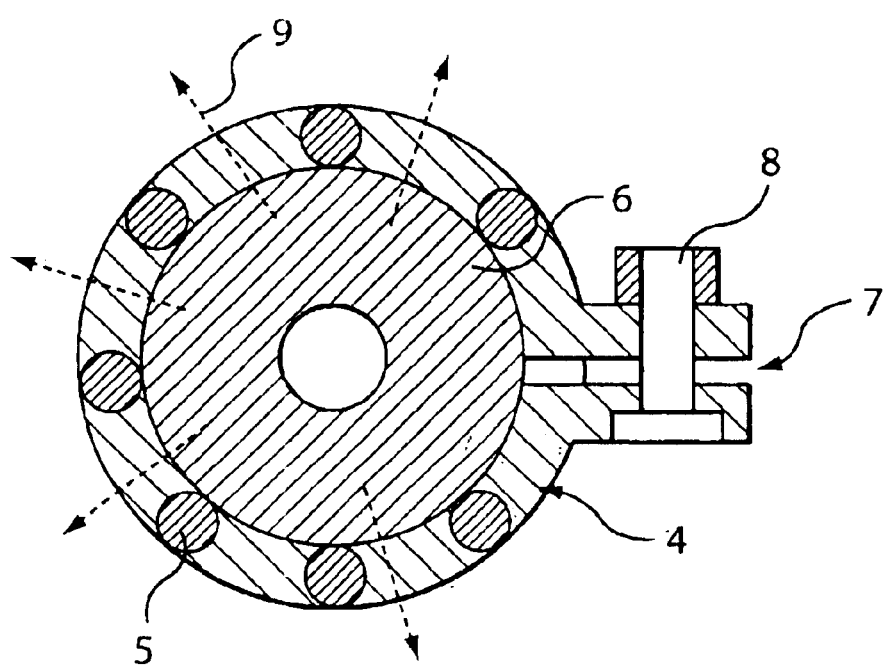
FIG. 1 is a cross-sectional view of a prior art cylindrical heating sleeve installed on a nozzle body.
Figure 2:
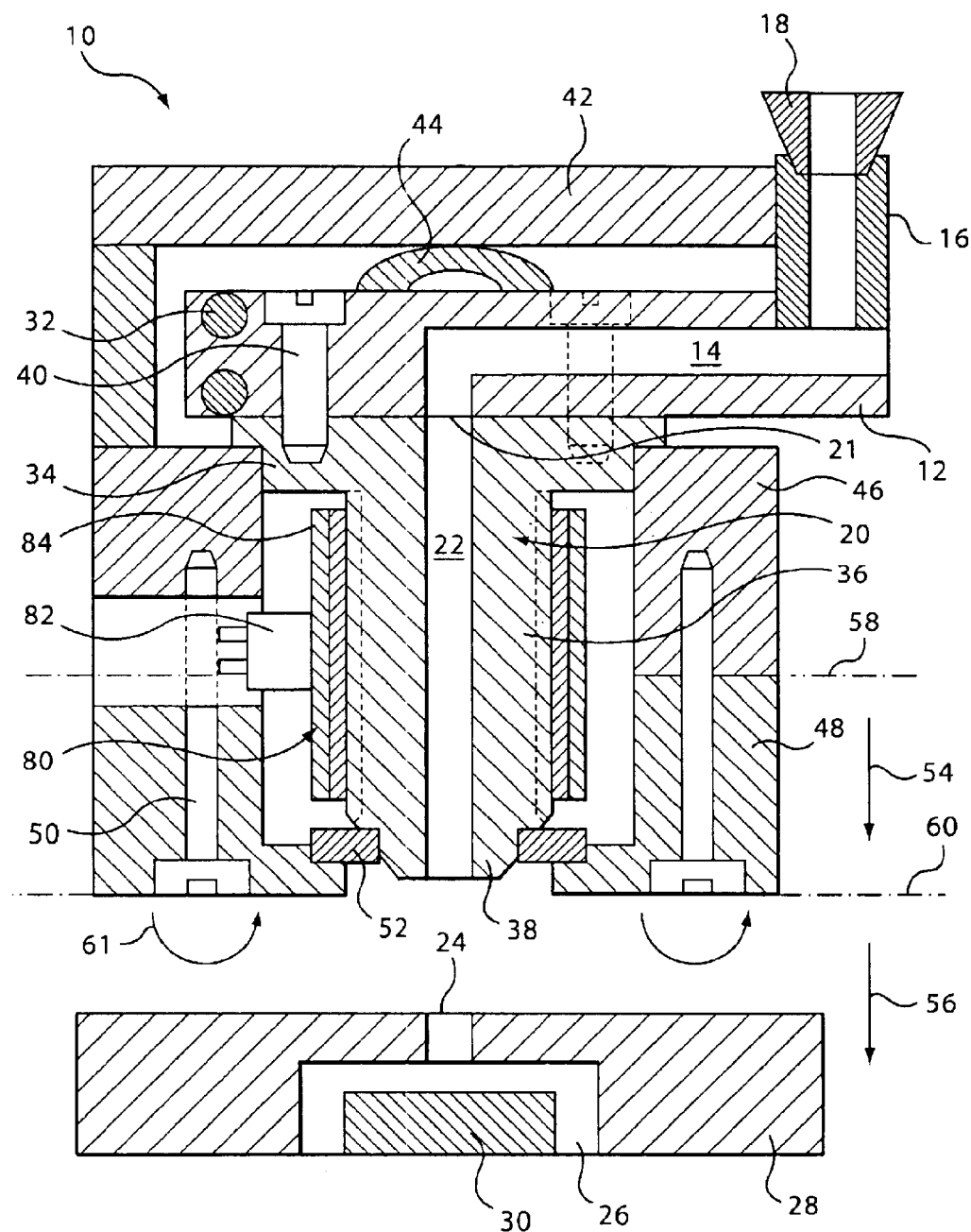
FIG. 2 is a side sectional view of a portion of an injection molding apparatus including a removable heating assembly according to an embodiment of the present invention.

Referring now to FIG. 2, an injection molding apparatus according to an embodiment of the present invention is generally shown at 10. The injection molding apparatus 10 comprises a manifold 12 having a manifold melt channel 14 for receiving a melt stream of moldable material under pressure from a manifold bushing 16. The manifold bushing 16 extends between a backing plate 42 and the manifold 12 and is in communication with a machine nozzle 18. A spacer 44 is provided between the backing plate 42 and the manifold 12. The spacer 44 is typically flexible in order to compensate for heat expansion of the injection molding apparatus 10.

A hot runner nozzle 20 is coupled to an outlet 21 of the manifold 12. A nozzle channel 22 extends through each nozzle 20 for receiving the melt stream of moldable material from the manifold 12. A mold gate 24 is located adjacent the tip of each nozzle 20. The flow of moldable material through the mold gate 24 is controlled to allow delivery of the melt stream to a mold cavity 26. The mold cavity 26 is delimited by a first mold plate 28 and a mold core 30. The mold gate 24 of the injection molding apparatus 10 shown is thermal gated ie. the flow of melt is halted at the mold gate 24 by freezing the melt stream at that point. The mold gate 24 alternatively may be opened and closed by a valve pin. The valve pin would extend through the length of each nozzle 20 and be movable by a valve piston to open and close the mold gate 24.

Any number of nozzles 20 can be used to feed either a single or a plurality of mold cavities 26. Manifold heaters 32 maintain the melt stream in the manifold 12 at a desired temperature and cooling channels (not shown) facilitate cooling of the mold cavities 26.

The nozzle 20 of FIG. 2 is referred to as a front mounted nozzle. The nozzle 20 includes a nozzle head 34, a nozzle body 36 and a nozzle tip 38. The nozzle head 34 is secured to the manifold by fasteners 40. A second mold plate 46 and a third mold plate 48 are layered between the nozzle head 34 and the first mold plate 28. The third mold plate 48 is coupled to the second mold plate 46 by fasteners 50. The fasteners 50 are typically threaded fasteners that are removable, as indicated by arrows 61. Mounting elements 52 are coupled to the third mold plate 48. The mounting elements 52 extend inwardly toward the nozzle 20 to locate the nozzle 20 relative to the third mold plate 48. As indicated by arrows 54 and 56, the injection molding apparatus 10 is separable at parting lines 58 and 60, respectively.

According to one aspect of the present invention, a heater assembly 80 surrounds the nozzle 20 to maintain the melt stream in the nozzle 20 at a desired temperature. The heater assembly 80 generally includes a heating element 84 that is coupled to an annular heater sleeve 86. An electrical connector 82 is provided for coupling the heater assembly 80 to a power source (not shown). The heater assembly 80 is removable from the nozzle 20 as will be described in greater detail in relation to FIGS. 3 to 6.

In some applications, such as automotive molding in which hot runner nozzles are typically longer, several heater assemblies 80 can be used in conjunction with a single nozzle. These heater assemblies can be coupled to a single or multiple power sources. The heater assemblies 80 can be used to provide a varying temperature profile along the nozzle.

In the injection molding apparatus 10, access to the nozzle 20 is achieved by separating the first mold plate 28 from the third mold plate 48 along parting line 60. Fasteners 50 are then unscrewed and the third mold plate 48 is separated from the second mold plate 46. This allows the nozzle 20 to be exposed so that an operator is able to replace parts that are not operating properly, for example, such parts include nozzle tips 38, nozzle seals (not shown), removable heaters 80 and thermocouples (not shown). The injection molding apparatus 10 is re-assembled by performing the above steps in the reverse order.

Front mounted nozzles allow an operator to gain access to the nozzle 20 from the mold side of the injection molding apparatus 10. Although this arrangement allows the operator to gain access to the nozzle 20, the nozzle 20 itself is not removable without removing the entire mold from the injection molding apparatus 10. Reference is made to U.S. Pat. Nos. 6,343,925, 6,164,954 and 6,220,851, which show various known nozzle designs.

Figure 3:
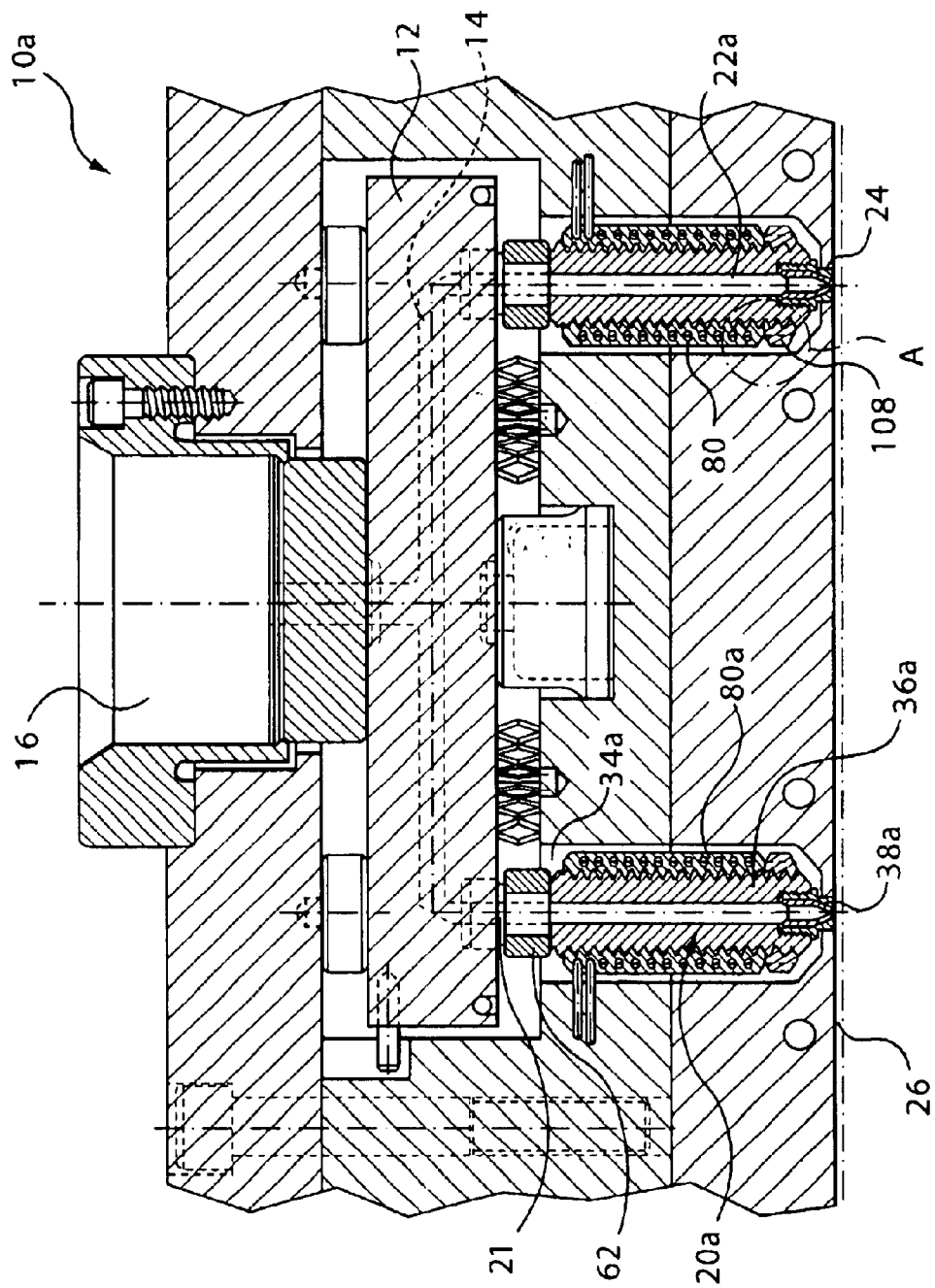
FIG. 3 is a side view of an injection molding apparatus including a removable heater assembly according to another embodiment of the present invention.

An injection molding apparatus 10a having a nozzle 20a that screws into the manifold 12 is shown in FIG. 3. FIG. 3 shows another embodiment of the present invention in which like reference numerals represent like parts. Nozzle 20a of FIG. 3 is also a front mounted nozzle, however, nozzle 20a is removable from the injection molding apparatus 10a. The nozzle head 34a includes threads (not shown) to mate with a manifold mounting nut 62 that is coupled to the manifold 12. The screw-in nozzle 20a can be easily unscrewed and removed by an operator from the mold side of the apparatus 10a. A heater assembly 80a according to another embodiment of the present invention is removable from the nozzle 20a. The heater assembly 80a can be removed when the nozzle 20a is mounted in the injection molding apparatus 10a or when the nozzle 20a has been removed from the injection molding apparatus 10a.

Figure 4:
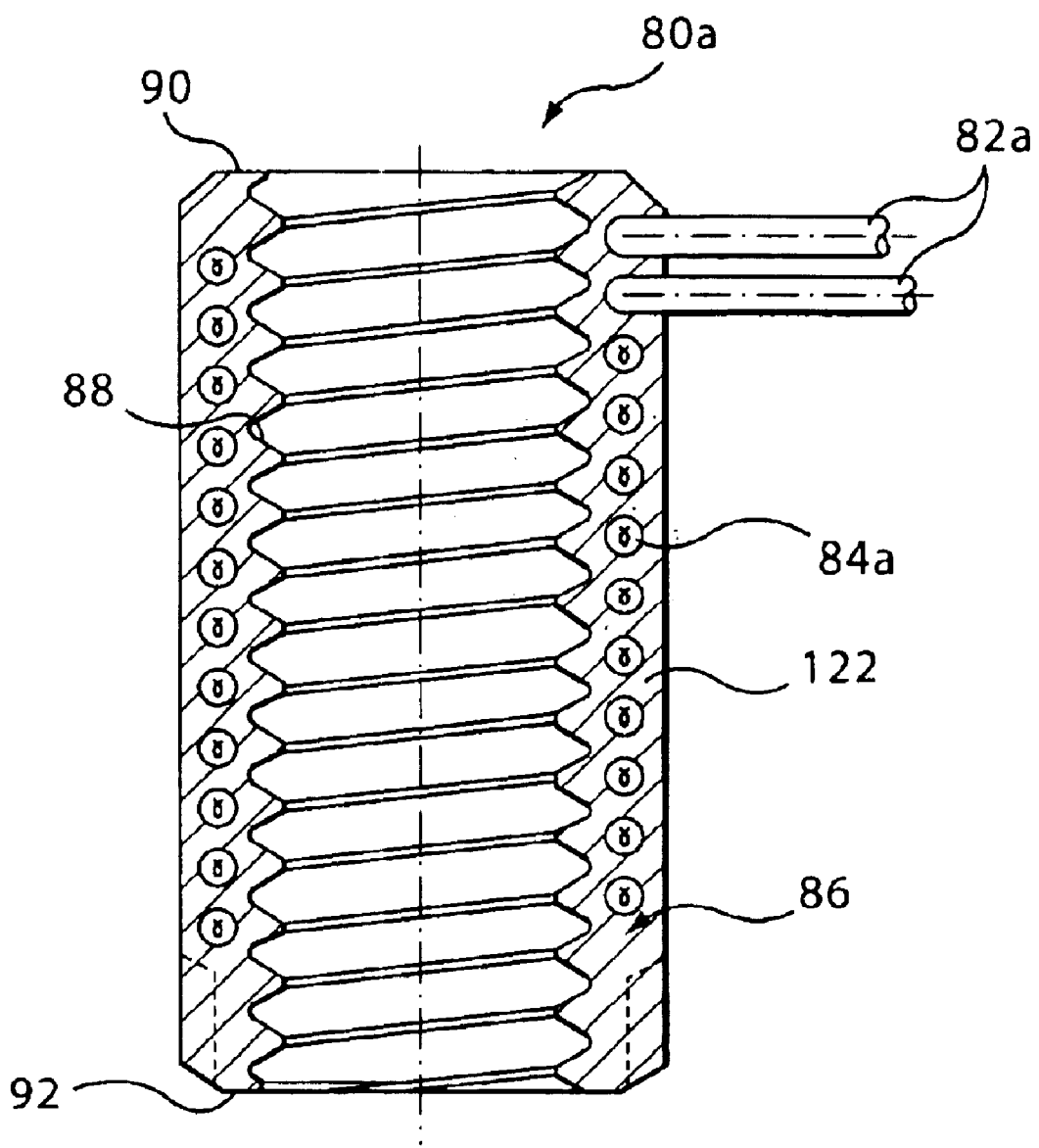
FIG. 4 is side sectional view of a removable heater of FIGS. 2 and 3.

The heater assembly 80a will now be described in detail with reference to FIGS. 3 to 6. The heater assembly 80a includes annular heater sleeve 86, shown in FIG. 4, having a threaded inner surface 88. The heater sleeve 86 includes a heater sleeve body 122 having a first end surface 90 and a second end surface 92. The heater sleeve 86 is sized to extend along a portion of the nozzle body 36a between the nozzle head 38a and the nozzle tip 38a of the hot runner nozzle 20a. The first end surface 90 and the second end surface 46 are generally parallel to one another. A coiled heating element 84a extends through the heater sleeve 86. The heater sleeve 86 according to the embodiment of FIG. 4 is manufactured by a casting process so that the heating element 84a is fully embedded therein. An electrical connector 82a extends from the heater sleeve 86 and is coupled to a power source (not shown) to provide power to heat the heating element 84a. The heater sleeve 86 is comprised of a highly conductive material such as copper, beryllium copper or copper alloy. Alternatively, the heater sleeve 86 may be comprised of any suitable conductive material, such as steel.

Figure 5:
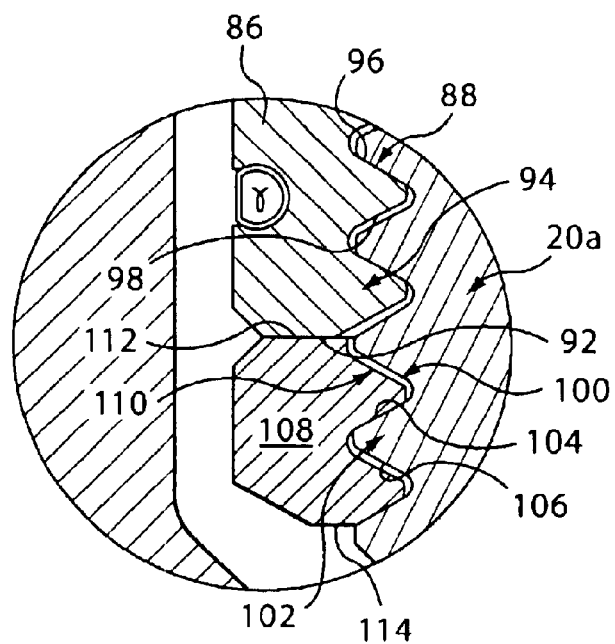
FIG. 5 is an enlarged view of portion A of FIG. 3.

As shown in FIG. 5, the threaded inner surface 88 of the heater sleeve 86 engages a threaded outer surface 100 of the nozzle 20a. In cross-section, the threaded inner surface 88 can be seen to have a series of individual thread elements 94. Each thread element 94 includes a first surface 96, which is also referred to as a leading surface, and an opposing second surface 98, which is also referred to as a trailing surface. The threaded outer surface 100 of the nozzle 20a similarly includes a series of individual nozzle thread elements 102. Each of the nozzle thread elements 102 includes a third surface 104 and an opposing fourth surface 106. As shown, the first surfaces 96, which are also referred to as leading surfaces, of the thread elements 94 of the heater sleeve 86 are directed towards the fourth surfaces 106 of the nozzle thread elements 102.

A lock nut 108 includes a threaded inner surface 110 for engaging the threaded outer surface 100 of the hot runner nozzle 20a. The lock nut 108 includes a mating surface 112 for abutting the second surface 92 of the heater sleeve 86 and an opposing surface 114. The opposing surface 114 is directed towards the nozzle tip 38a of the hot runner nozzle 20a. The lock nut 108 is generally of conventional lock nut construction and is comprised of any suitable conductive material such as steel, copper, beryllium copper or copper alloy. In some cases, the nut 108 may be comprised of a less thermally conductive material such as titanium or titanium alloys. When it is desirable to locally reduce the temperature, the nut 108 is comprised of an insulation material. Insulation materials include ceramics such as Zirconia, for example, polymides such as Vespel→, which is manufactured by Dupont, for example, polymers such as Teflon, which is manufactured by Dupont, or Peek™, which is manufactured by Victrex, for example, or graphite.

Figure 6:
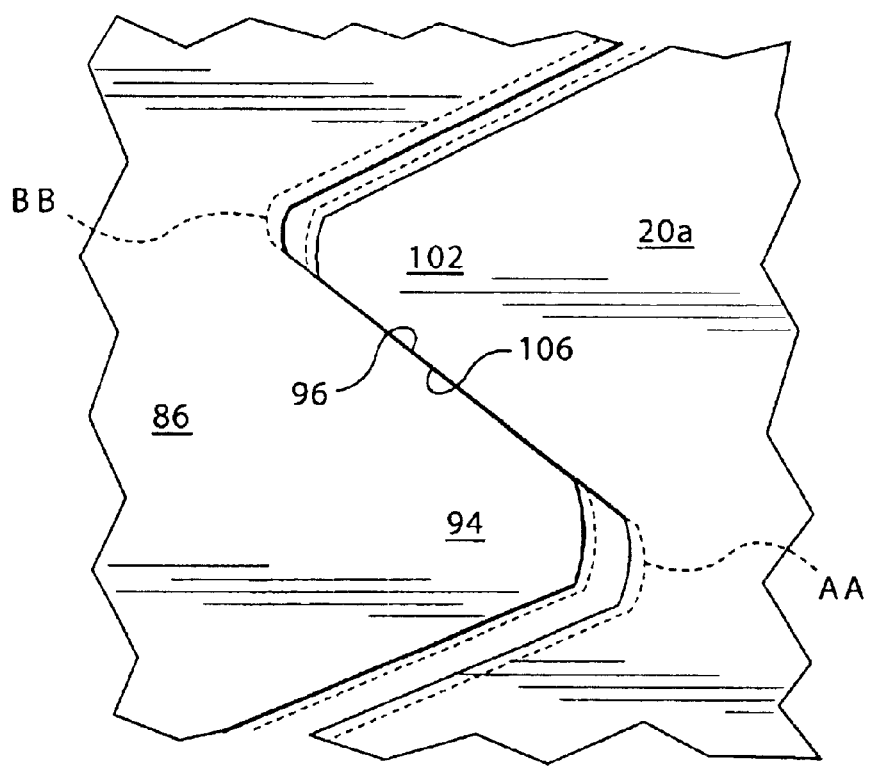
FIG. 6 is an enlarged view of a portion of FIG. 6.

Referring to FIG. 6, an enlarged view of the contact between a heater sleeve thread element 94 and a nozzle thread element 102 is shown. According to the present invention, the contact between the heater sleeve thread elements 94 and the nozzle thread elements 102 is maintained in cold conditions when attaching the heater sleeve 86 to the nozzle 20a and in hot conditions. The hot conditions vary depending on the temperature required by the molding process. The thermal expansion in both the radial and axial directions of the nozzle 20a and of the heater sleeve 86 does not result in complete disengagement between the threaded inner surface 88 of the heater sleeve 86 and the threaded outer surface 100 of the nozzle 20a. The clamping force generated between the thread elements 94 and 102 allows the heater sleeve 86 to be in permanent contact with the nozzle 20a independent of the temperature of the heater assembly 80a. The magnitude of the clamping force depends in part on the coefficient of thermal expansion of the materials used to make the heater sleeve 86 and the nozzle body 36a. It will be appreciated that if the nozzle body 36a expands radially more than the heater sleeve the clamping force is higher.

The dashed profile AA represents the heated condition of the nozzle 20a and the dashed profile BB represents the heated condition of the heater sleeve 86. As shown, the first surface 96 of the thread element 94 of the heater sleeve 86 is in constant contact with the fourth surface 106 of the nozzle thread element 102. The constant contact between the opposing surfaces 94 and 106 occurs as a result of the lock nut 108 of the heating assembly 80 applying a force against the second end surface 92 of the heater sleeve 86. Therefore, regardless of the temperature of the nozzle 20a and the heater assembly 80, the first surfaces 96 of the thread elements 94 of the heater sleeve 86 remain in constant contact with the fourth surfaces 106 of the nozzle thread elements 102.

The magnitude of the clamping force generated between the threaded inner surface 88 of the heater sleeve 86 and the threaded outer surface of the nozzle 20a is influenced in part by the selection of the materials of the nozzle 20a and of the heater sleeve 86. In another embodiment of the present invention, a cut or slot is provided along the length of the heater sleeve 86. This slot provides the heater sleeve with further spring characteristics to vary the clamping force for specific molding applications.

It will be appreciated that the threaded connection between the heater sleeve 86 and the nozzle 20a is not limited to the profile shown in FIGS. 3–6. A threaded profile of any known workable shape could be used. For threaded profiles in which the thread elements are in full contact with one another, the heater assembly 80 of FIG. 2 would typically be used. Any profile or shape which is in-printed, stamped, cut or molded on the inner surface of the heater sleeve 86 and the outer surface of the nozzle 20a can also be used to provide a clamping force when the heater sleeve 86 is located on the nozzle 20a.

The heater assembly 34 is installed by screwing the heater sleeve 86 onto the hot runner nozzle 20a so that the threaded inner surface 88 of the heater sleeve 86 engages the threaded outer surface 100 of the hot runner nozzle 20a. The threaded outer surface 100 of the hot runner nozzle 20a provides a first engaging surface having a first profile. The threaded inner surface 88 of the heater sleeve 86 provides a second engaging surface having a second profile. The first and second profiles mesh to couple the heater sleeve 86 to the hot runner nozzle 20a. The lock nut 108 is then screwed onto the threaded outer surface 100 of the nozzle 20a. The mating surface 112 of the lock nut 108 abuts the second end surface 92 of the heater sleeve 86 to force the first surfaces 96 of the heater sleeve thread elements 94 into contact with the fourth surfaces 106 of the nozzle thread elements 102. This arrangement causes the heater sleeve 86 to be clamped onto the hot runner nozzle 20*a*.

During operation of the injection molding apparatus 10*a* of FIG. 3, a hot pressurized melt stream of moldable material is introduced into the manifold bushing 16 from the machine nozzle 18. The melt stream flows through the manifold melt channel 14 into the nozzle channels 22*a* of the nozzle 20*a*. The flow of melt into the mold cavities 26 is selectively controlled by the thermally controlled mold gate 24.

In order to ensure successful operation of the injection molding apparatus 10*a*, the melt stream must be maintained within a certain temperature range as it flows through the nozzle channels 22*a* of the nozzles 20*a* toward the mold gates 24. The heating assembly 80 therefore heats each nozzle 20*a*. The lock nut 108 of the heating assembly 80 forces the heater sleeve thread elements 94 and the nozzle thread elements 102 into contact with one another to clamp the heater sleeves 86 onto the nozzles 20*a*. This allows for efficient heat transfer to take place between the heater assembly 80 and the nozzle 20*a* to heat the melt stream.

Figure 7:
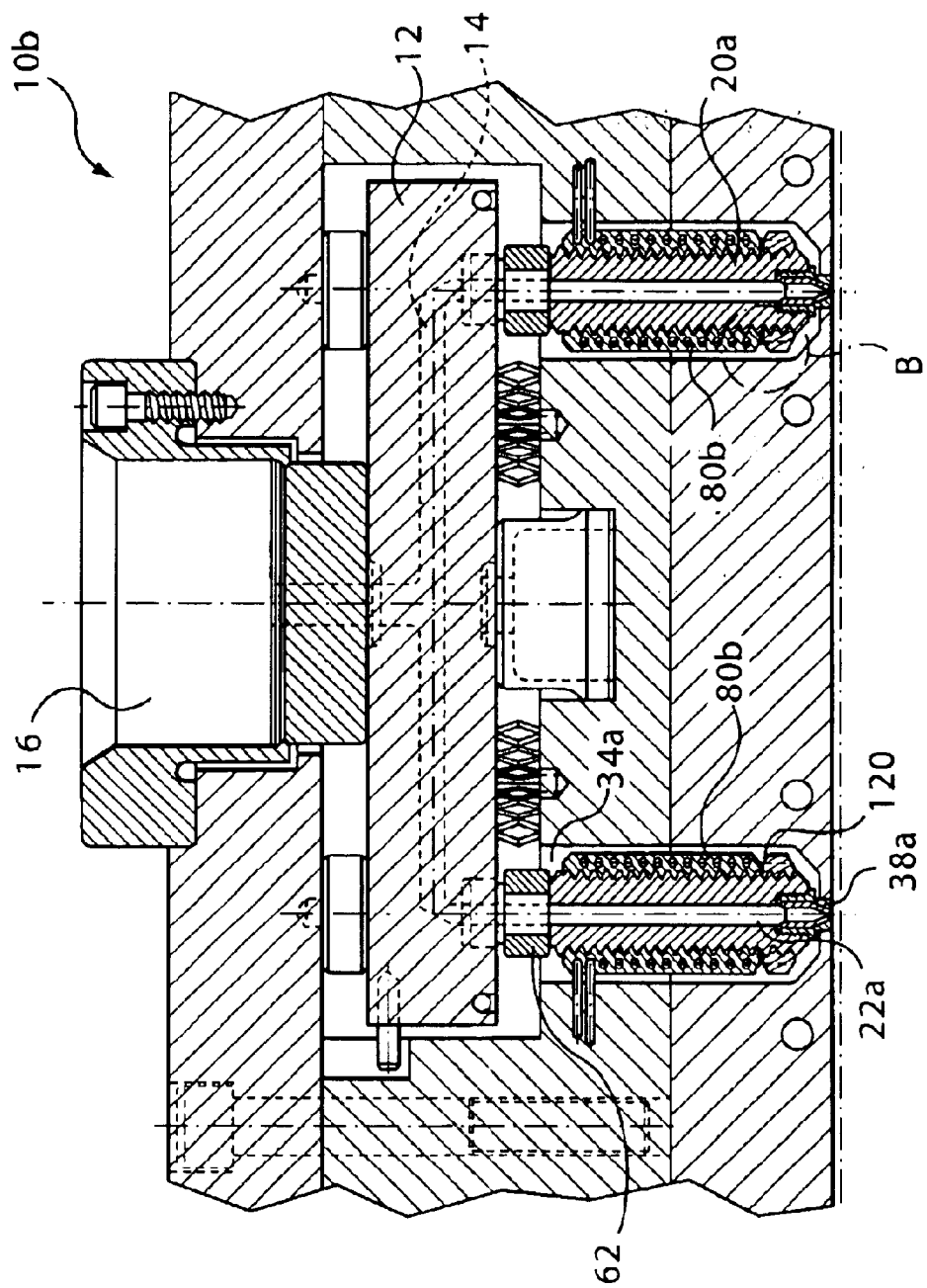
FIG. 7 is a side view of an injection molding apparatus including a removable heater assembly according to another embodiment of the present invention.
Figure 8:
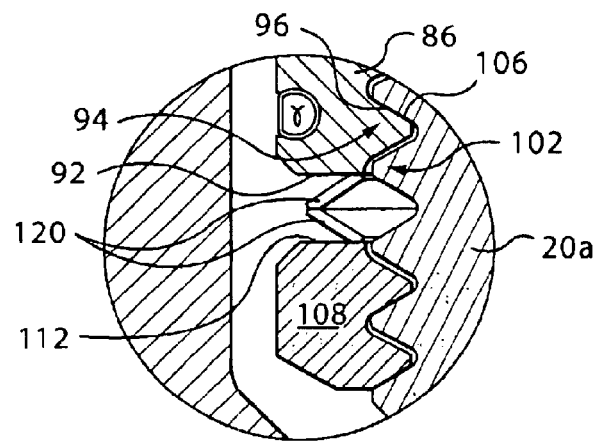
FIG. 8 is an enlarged view of portion B of FIG. 7, which shows a heater sleeve and lock nut separated by a spring arrangement.

Referring to FIG. 7, another embodiment of a heater assembly 80*b* is shown. Heater assemblies 80*b* are coupled to nozzles 20*a* of an injection molding apparatus 10*b*, which is similar to injection molding apparatus 10*a* of FIG. 3. The heater assembly 80*b* is similar to that shown in FIG. 3, with the addition of a pair of springs 120. The springs 120 are located between the mating surface 112 of the lock nut 108 and the second end surface 92 of the heater sleeve 86. As shown in FIG. 8, the springs 120 force the first surfaces 96 of the heater sleeve thread elements 94 into contact with the fourth surfaces 106 of the nozzle thread elements 102. The springs 120 are Belleville discs and are arranged to face one another.

The embodiment of FIG. 8 allows for relative movement between the lock nut 108 and the heater sleeve 86. The springs 120 provide an initial clamping force, or load, between the nozzle 20*a* and the heater sleeve 86. The springs 120 further compensate for the thermal expansion due to heating by ensuring that a pressure is continuously applied between the lock nut 108 and heater sleeve 86. The springs 120 also allow the heater sleeve to clamp onto the nozzle 20*a* during cold or variable conditions.

Figure 9:
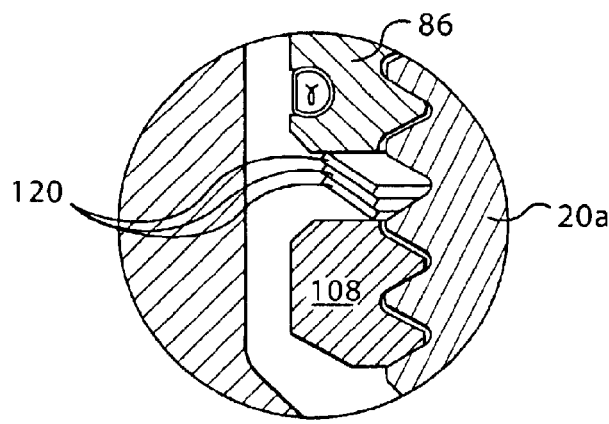
FIG. 9 is a view similar to FIG. 8 including a second spring arrangement.
Figure 10:
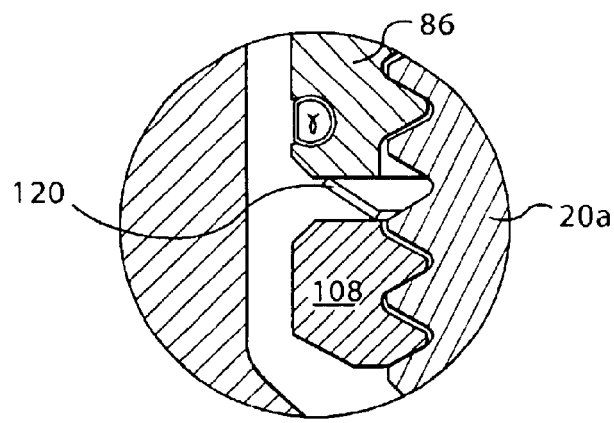
FIG. 10 is a view similar to FIG. 8 including a third spring arrangement.

FIGS. 9 and 10 show different spring arrangements that may be used in place of the spring arrangement of FIG. 8. FIG. 9 includes three springs 120 that are nested within one another. The larger diameter side of the springs 120 is directed toward the second end surface 92 of the heater sleeve 86. FIG. 10 includes a single spring 120. Similar to FIG. 9, the larger diameter side of the spring 120 is directed toward the second end surface 92 of the heater sleeve 86.

It will be appreciated that the type of spring is not limited to a Belleville disc. Any suitable type of spring may be used. The spring 120 may be made of any suitable material. The spring 120 may alternativley be a thermally conductive element having a higher thermal conductivity than the heater sleeve 86 and the lock nut 108.

Figure 11:
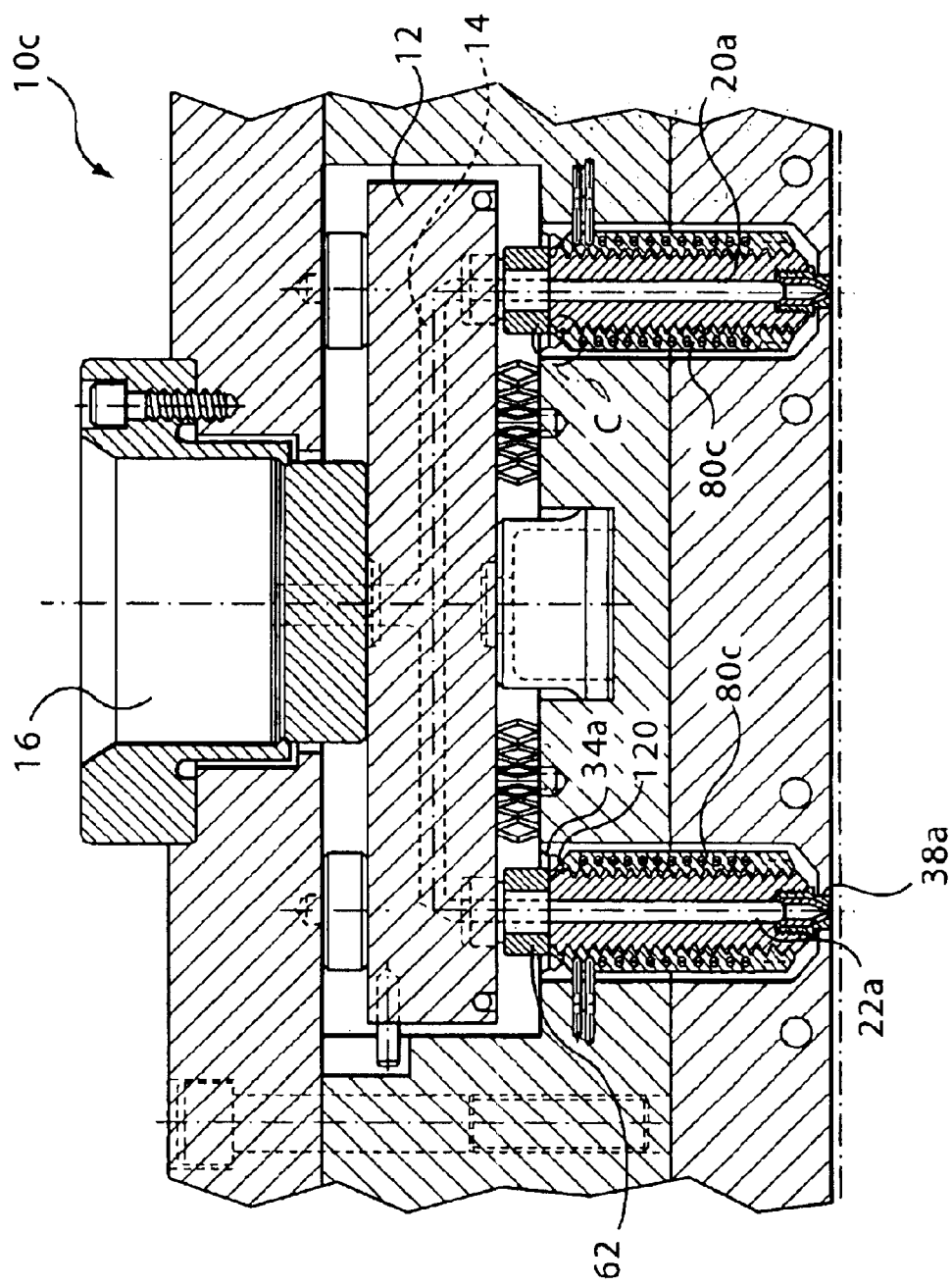
FIG. 11 is a side view of an injection molding apparatus including a removable heater assembly according to yet another embodiment of the present invention.
Figure 12:
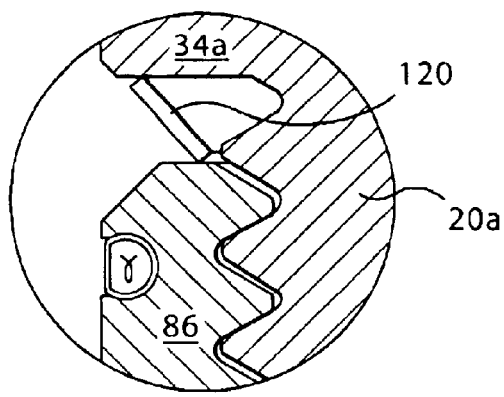
FIG. 12 is an enlarged view of portion C of FIG. 11, which shows a nozzle head and a heater sleeve separated by a spring.

Another embodiment of a heater assembly 80*c* is shown in FIG. 11. The heater assembly 80*c* is coupled to nozzles 20*a* of an injection molding apparatus 10*c*, which is similar to injection molding apparatus 10*a* of FIG. 3. As shown in FIG. 12, a spring 120 is located between the head 34*a* of the nozzle 20*a*, where the head 34*a* is coupled to the manifold mounting nut 62, and the first end surface 90 of the heater sleeve 86. The spring 120 exerts a force on the heater sleeve 86 in the direction of the nozzle tip 34*a* of the nozzle 20*a*. This causes the second surfaces 98 of the heater sleeve thread elements 94 to abut the third surfaces 104 of the nozzle thread elements 102. Similar to the embodiment of FIG. 7, the spring 120 is a Belleville disc that is arranged with the larger diameter side facing toward the nozzle head 34*a*.

Figure 13:
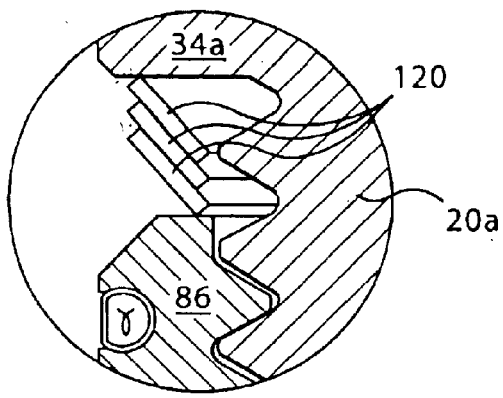
FIG. 13 is a view similar to FIG. 12 including a second spring arrangement.
Figure 14:
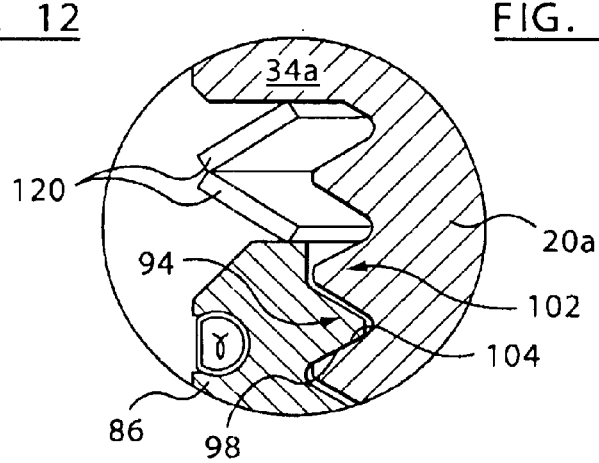
FIG. 14 is a view similar to FIG. 12 including a third spring arrangement.

FIGS. 13 and 14 show different spring arrangements that may be used in place of the spring arrangement of FIG. 12. FIG. 13 includes three springs 120 that are nested within one another. The larger diameter side of the springs 120 is directed toward the nozzle head 34*a*. FIG. 14 includes a pair of springs 120 that are arranged to face one another.

Referring to FIGS. 15 to 19, second, third, fourth, fifth and sixth heater sleeves 186, 286, 386, 486 and 586, respectively, are shown. The heater sleeves 186, 286, 386, 486 and 586 can be used in place of the heater sleeve 86 in any of the disclosed heater assembly embodiments.

Figure 15:
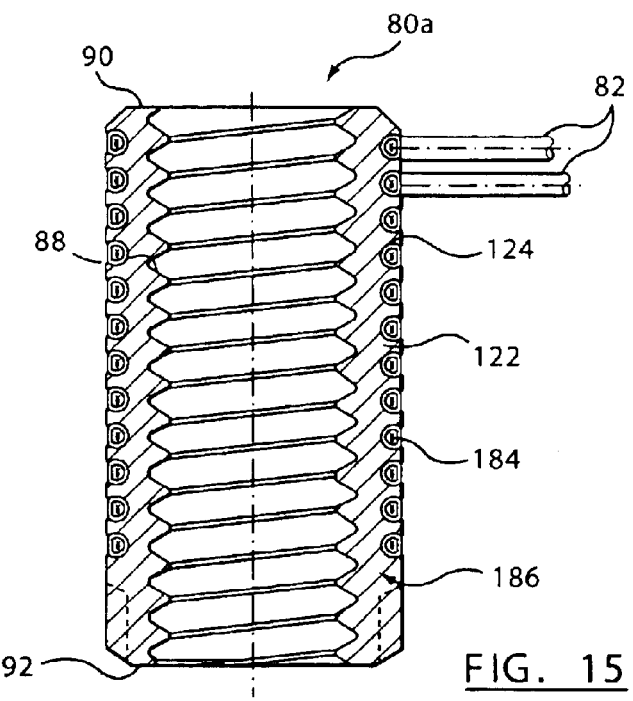
FIG. 15 is a side sectional view of a second removable heater sleeve.

The heater sleeve 186 of FIG. 15 includes a coiled heating element 184 that is partially embedded into the outer surface of the heater sleeve body 122. A groove 124 is formed in the heater sleeve body 122 and the heating element 184 is pressed or brazed into the groove 124.

Figure 16:
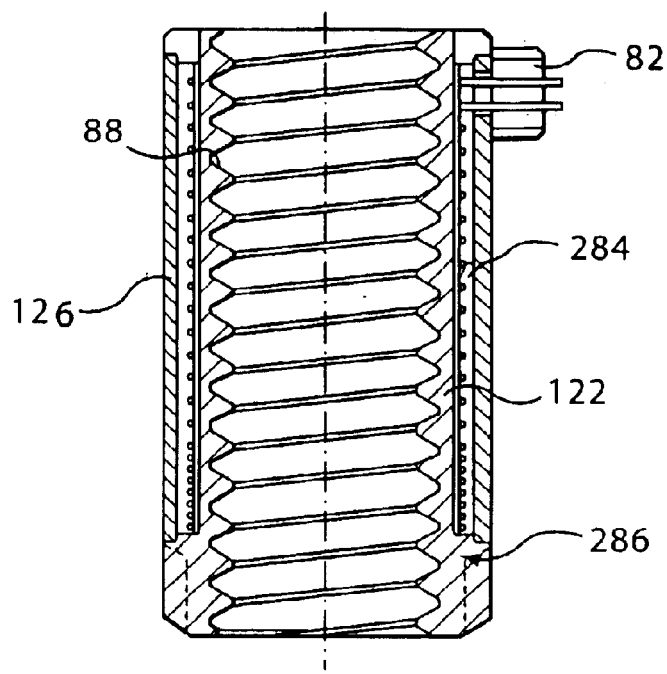
FIG. 16 is a side sectional view of a third removable heater sleeve.

The heater sleeve 286 of FIG. 16 includes a non-coiled heating element 284 that is wound around the heater sleeve body 122. A cover sleeve 126 surrounds the heater sleeve body 122 to maintain the heating element 284 and the heater sleeve body 122 in contact with one another and therefore allow efficient heat transfer to occur.

Figure 17:
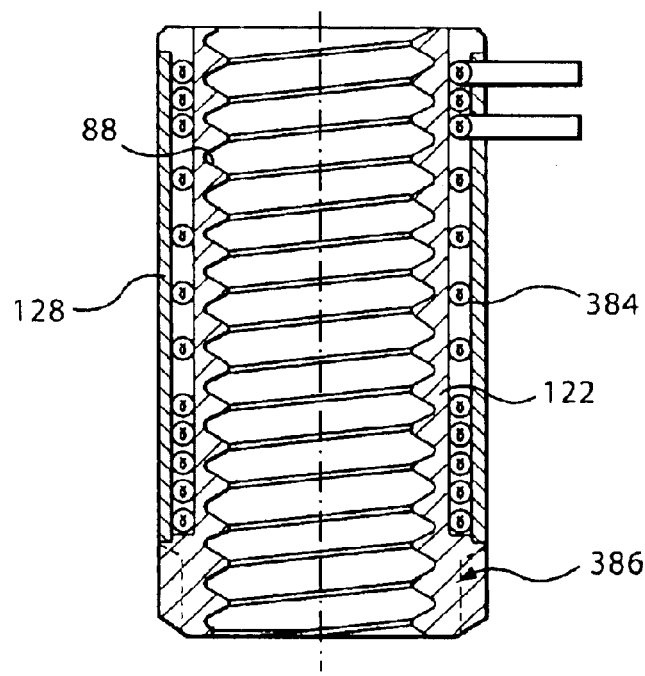
FIG. 17 is a side sectional view of a fourth removable heater sleeve.

In the heater sleeve 386 of FIG. 17, a coiled heating element 384 is would around a heater sleeve body 122. A cover sleeve 128 surrounds the heater sleeve body 122 to maintain the heating element 384 in contact with the heater sleeve body 122 to allow for efficient heat transfer therebetween.

Figure 18:
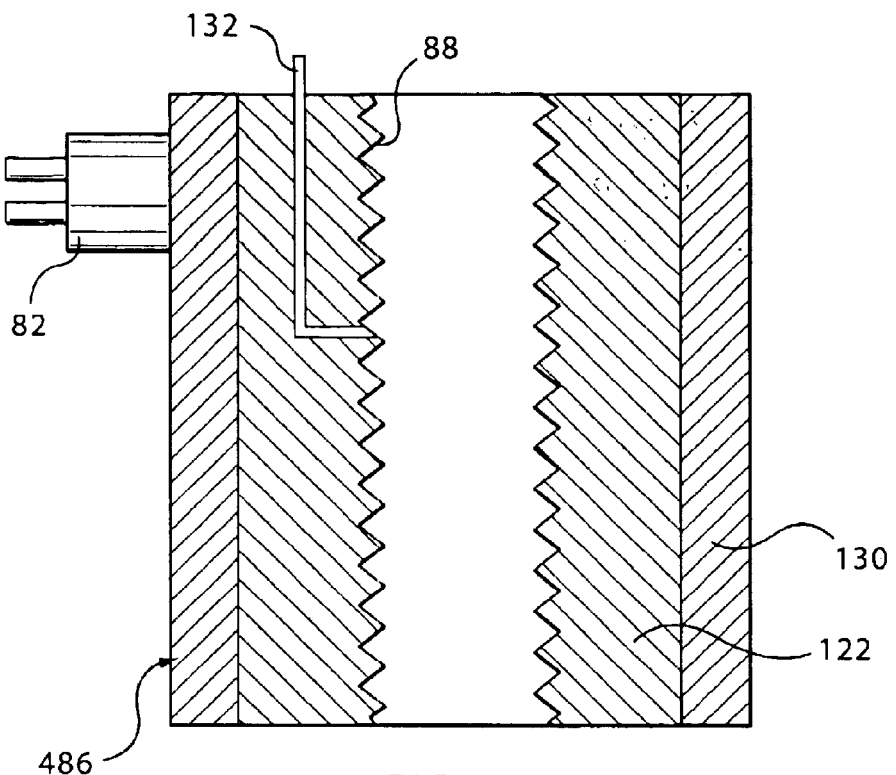
FIG. 18 is a side sectional view of a fifth removable heater sleeve.
Figure 19:
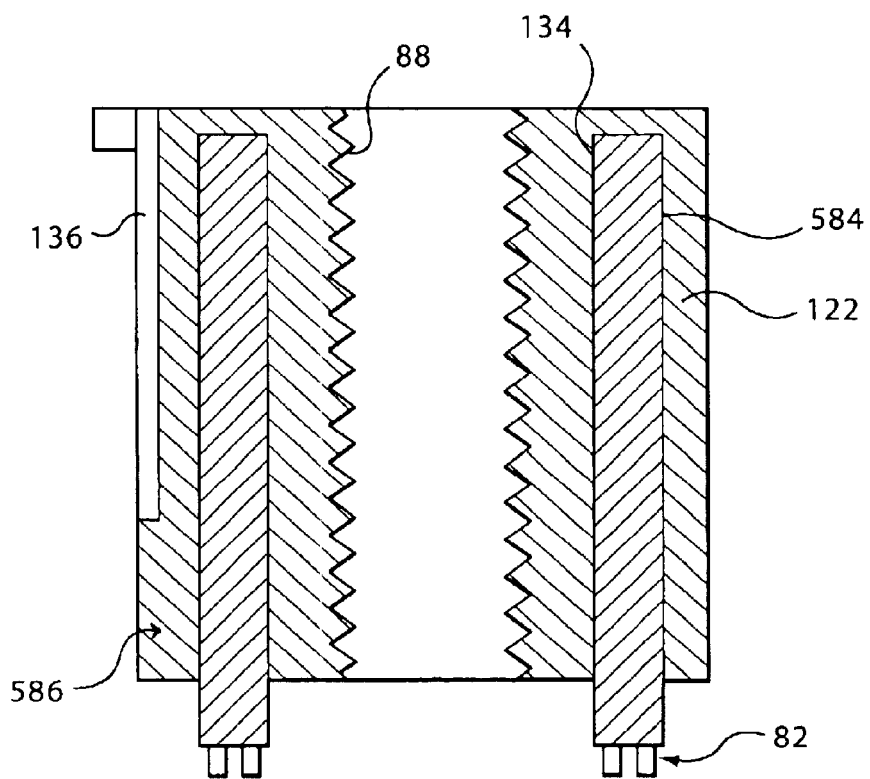
FIG. 19 is a side sectional view of a sixth removable heater sleeve.

The heater sleeve 486 of FIG. 18 includes a film layer 130 that surrounds the heater sleeve body 122. A patterned electrical heating element is contained within the film layer 130. The film layer 130 is made of several layers of different materials. These film layers include dielectrics and thermal insulating materials. These film layers can be applied using known techniques such as spraying, printing or vacuum deposition. These layers can be applied directly on the nozzle or on a separate piece bonded or attached to the nozzle 20*a*. The heater sleeve 486 includes a threaded inner surface 88. The electrical connector 82 is coupled to the film layer 130 for mating with a power source (not shown). A thermocouple 132 is coupled to the heater sleeve 486 to measure the temperature of the nozzle 20*a*.

The heater sleeve 586 of FIG. 17 includes a plurality of cartridge heating elements 584 that are located using any means, such as through an interference fit into holes 134 provided in the heater sleeve body 122. Each cartridge heating element 584 includes an electrical connector 82 for mating with a power source (not shown). A thermocouple 136 is coupled to the heater sleeve 586 to measure the temperature of the nozzle 20*a*.

The heater sleeves of FIGS. 15–19 may be comprised of a thermally conductive material, such as steel, or a highly thermally conductive material, such as copper, beryllium copper or copper alloy.

It will be appreciated by a person skilled in the art of injection molding that the heater sleeves according to the present invention may further be provided with a surface for engaging a tool. For example, a hexagonal surface similar to the outer surface of the lock nut 108 may be provided on the heater sleeve body 122 in order to facilitate installation and removal of the heater sleeve 86.

It will further be appreciated by a person skilled in the art of injection molding that the heater assembly 80 can be used with any front mounted nozzle. In addition, the heater assembly 80 may be used in an injection molding apparatus in which access to the nozzle is not provided from the mold side of the apparatus. An example of this type of nozzle is shown in German Patent No. DE19601102. In this case, the nozzle would be removed from the injection molding apparatus and then the nozzle tip, heater assembly 80 or thermocouple could be replaced.

Figure 20:
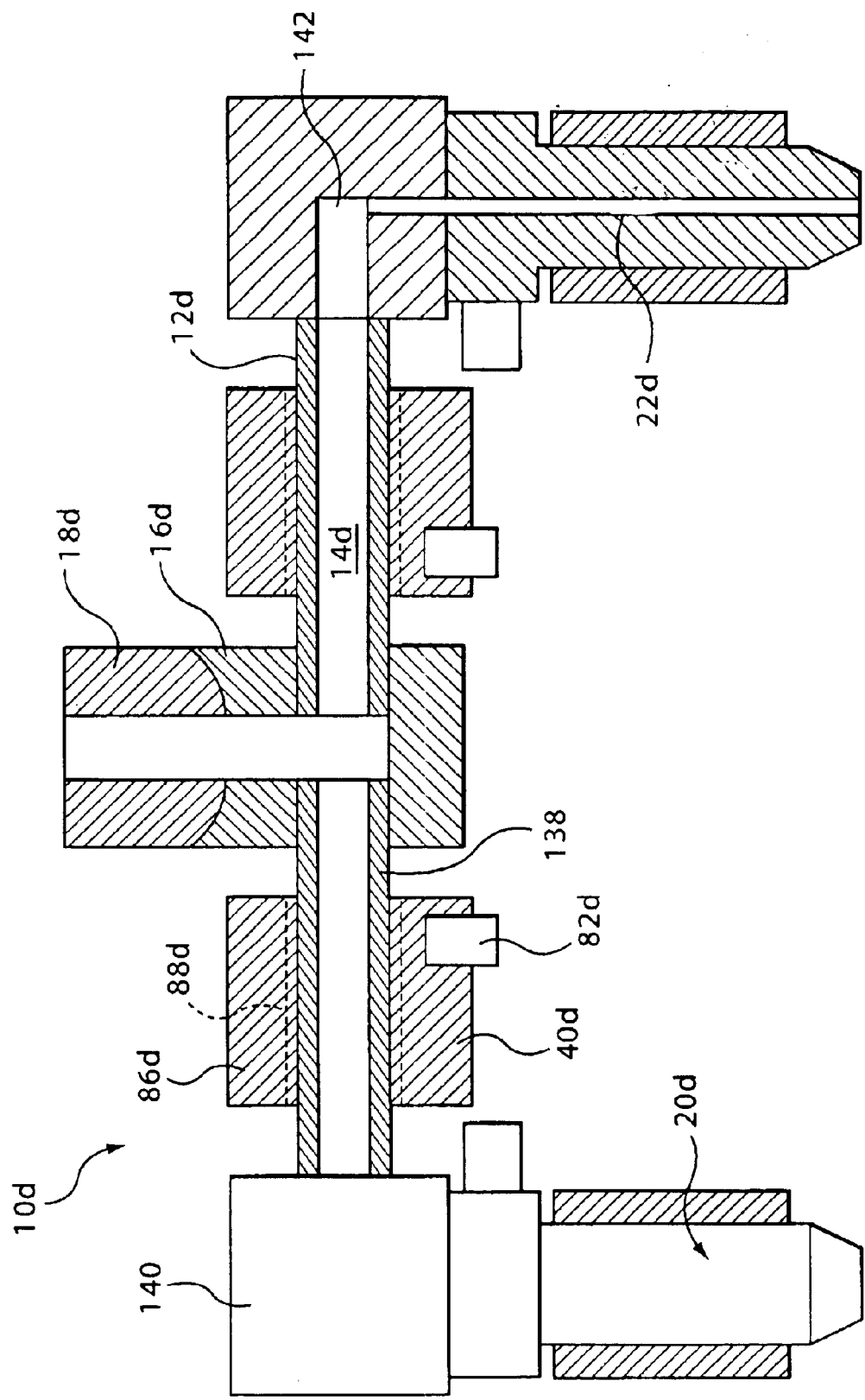
FIG. 20 is a side view partly in section of an injection molding apparatus including a circular manifold having a removable heater assembly according to the present invention.

Although the disclosed embodiments of the heater assembly have been described for use with a hot runner nozzle, the same heater assembly could be used elsewhere in an injection molding apparatus. According to another embodiment of the present invention, an injection molding apparatus 10d is shown in FIG. 20. The injection molding apparatus includes a tubular manifold 12d that is coupled to a sprue bushing 16d, which is in turn coupled to a machine nozzle 18d. The tubular manifold 12d includes a pair of tubular shafts 138, each having a manifold melt channel 14d extending therethrough. The tubular shafts 138 are at least partially threaded. The manifold melt channels 14d are joined to nozzle channels 22d of respective hot runner nozzles 20d by connector blocks 140. Each connector block 140 includes a generally right-angled melt channel 142 for directing the melt stream of moldable material from the manifold melt channel 14d to the nozzle channel 22d. A heater sleeve 86d having threads 88d surrounds each tubular shaft 138 and engages threads thereof. The heater sleeves 86d include electrical connectors 82d for mating with a power source (not shown). If desired, the heater sleeve 86d may be replaced by any of the heating assembly embodiments disclosed in the previous figures.

To install the heater sleeve 86d, the connector block 140 is removed and the heater sleeve is threaded onto the circular shaft 138. In operation, a hot pressurized melt stream of moldable material is introduced into the manifold bushing 16d from the machine nozzle 17d. The melt stream flows through the manifold melt channels 14d into the nozzle channels 22d of the nozzles 18d and into the mold cavities (not shown). The heater sleeves 86d maintain the melt stream within the appropriate temperature range as it flows through the manifold melt channels 14d.

Figure 21:
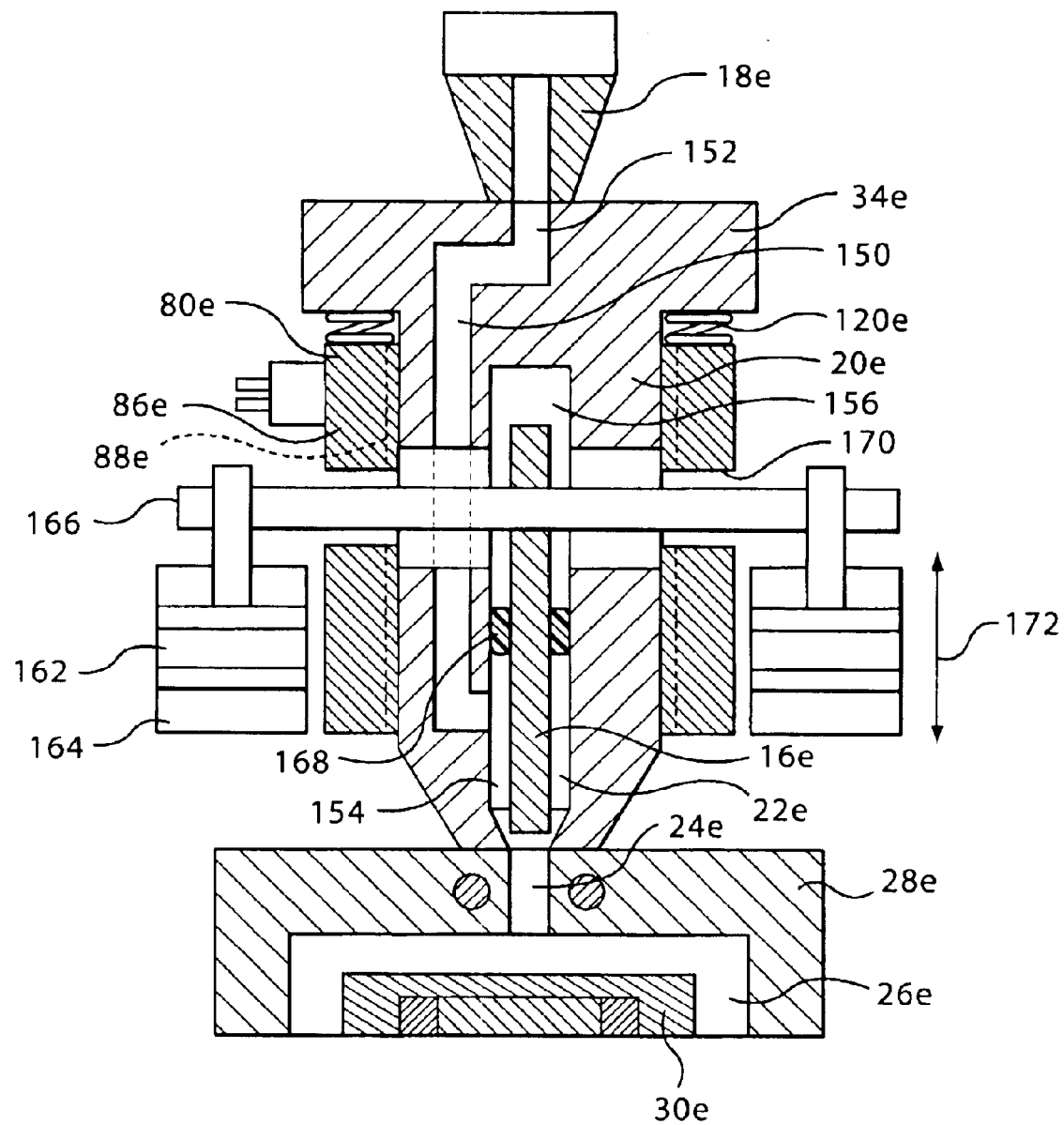
FIG. 21 is a side view partly in section of an in-line nozzle having a removable heater assembly according to the present invention.

Referring to FIG. 21, portions of an injection molding apparatus 10e in which a machine nozzle 18e delivers a melt stream of moldable material directly to an in-line nozzle 20e is shown. According to this embodiment of the present invention, the in-line nozzle 20e includes a nozzle channel 22e that has a diverted portion 150. The diverted portion 150 extends between a nozzle inlet 152 and a lower portion 154 of the nozzle channel 22e. A mold gate 24e of a mold cavity 26e is located adjacent the lower portion 154 of the nozzle channel 22e. The mold cavity 26e is delimited by a mold plate 28e and a mold core 30e. Cooling channels 158 are provided in the mold core 30e. A valve pin 160 extends through an upper portion 156 and the lower portion 154 of the nozzle channel 22e and is aligned with the mold gate 24e. A pair of piston 162 and cylinder 164 arrangements are disposed on either side of the nozzle 20e to actuate a valve pin/piston connector 166. The valve pin/piston connector 166 is coupled to the valve pin 160, to move the valve pin 160 axially within the nozzle channel 22e as indicated by arrow 170. A seal 168 is provided between the upper portion 156 and the lower portion 154 of the nozzle channel 22e to block melt from flowing into the upper portion 156. The seal 168 also serves as a guide to guide the axial movement of the valve pin 160.

A heater assembly 80e, similar to that shown in FIG. 11, surrounds the nozzle 20e. A threaded inner surface 88e of a heater sleeve 86e engages a threaded outer surface of the nozzle 20e. A spring 120e is disposed between a nozzle head 34e and the heater sleeve 86e. The heater sleeve 86e further includes an aperture 170 to allow the valve pin/piston connector 166 to pass therethrough. To install the heater assembly 80e, the valve pin/piston connector 166 is removed by sliding it axially out of engagement with the pistons 162. The heater assembly 80e is then threaded onto the nozzle 20e.

In operation, a hot pressurized melt stream of moldable material is introduced into the nozzle inlet 152 from the machine nozzle 18e. The melt stream flows through the diverted portion 150 of the nozzle channel 22e and into the lower portion 154 of the nozzle 20e. The valve pin/piston connector 166 is movable as indicated by arrow 172 by the pistons 162 to axially move the valve pin 160. Thus, the flow of melt into the mold cavities 26e is selectively controlled by the valve pin 160 as it moves into and out of engagement with the mold gate 24e.

Figure 22:
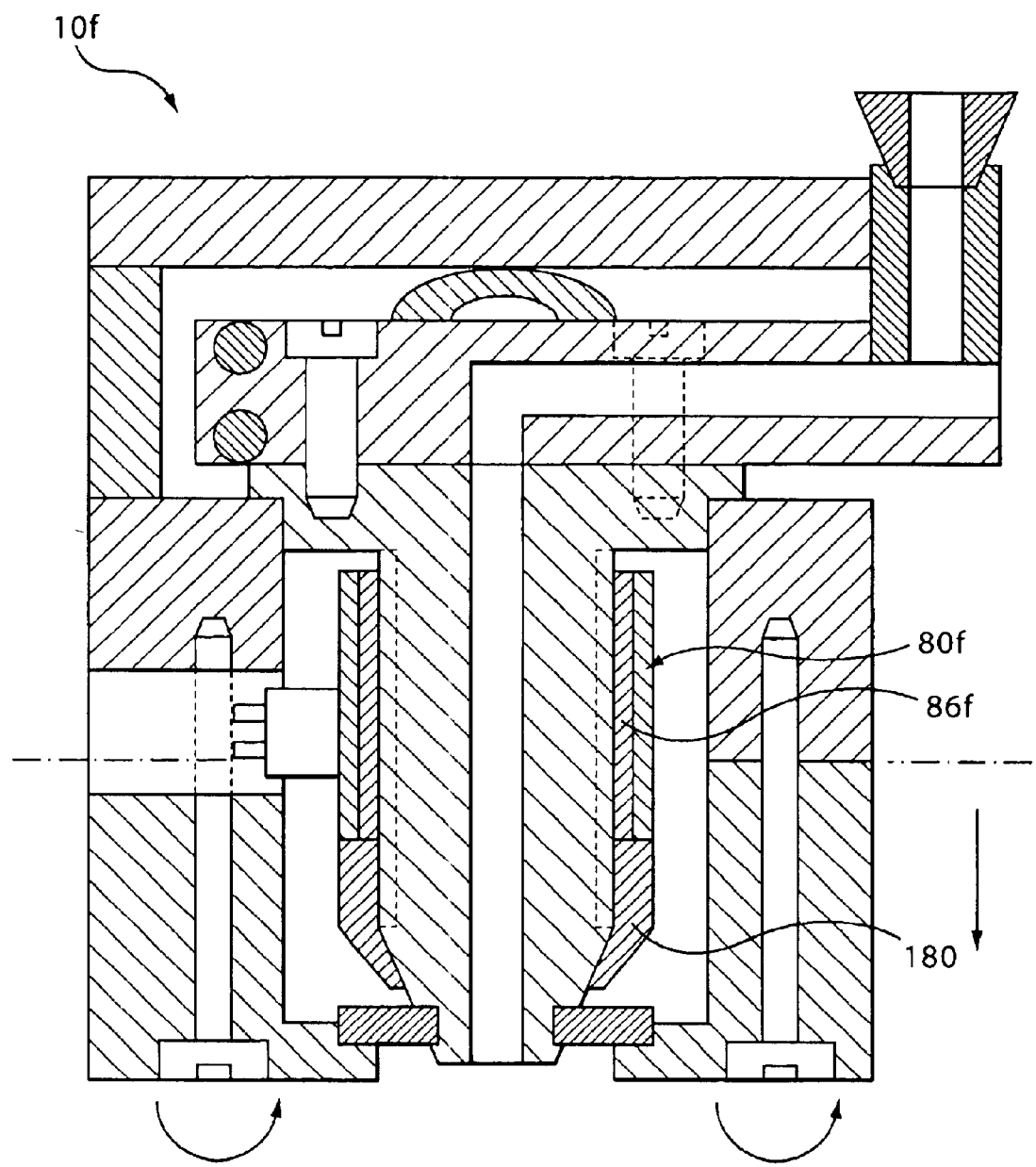
FIG. 22 is a side sectional view of an injection molding apparatus including a removable heater assembly according to another embodiment of the present invention.

Another embodiment of a heater assembly 80f according to the present invention is shown in FIG. 22. The injection molding apparatus 10f is similar to the injection molding apparatus of FIG. 2 and thus will not be described further. The heater assembly 80f is similar to the embodiment of FIG. 3, however, lock nut 108 has been replaced by nozzle tip nut 180. The nozzle tip nut 180 is screwed onto the nozzle 20f to abut the heater sleeve 86f. Unlike the lock nut 108, the nozzle tip nut 180 can only travel a predetermined distance onto the nozzle 20f. This has the advantage that installation of the heater assembly 80f is simplified because it is clear to the operator when the nozzle tip nut 180 is in the fully installed position.

Figure 23:
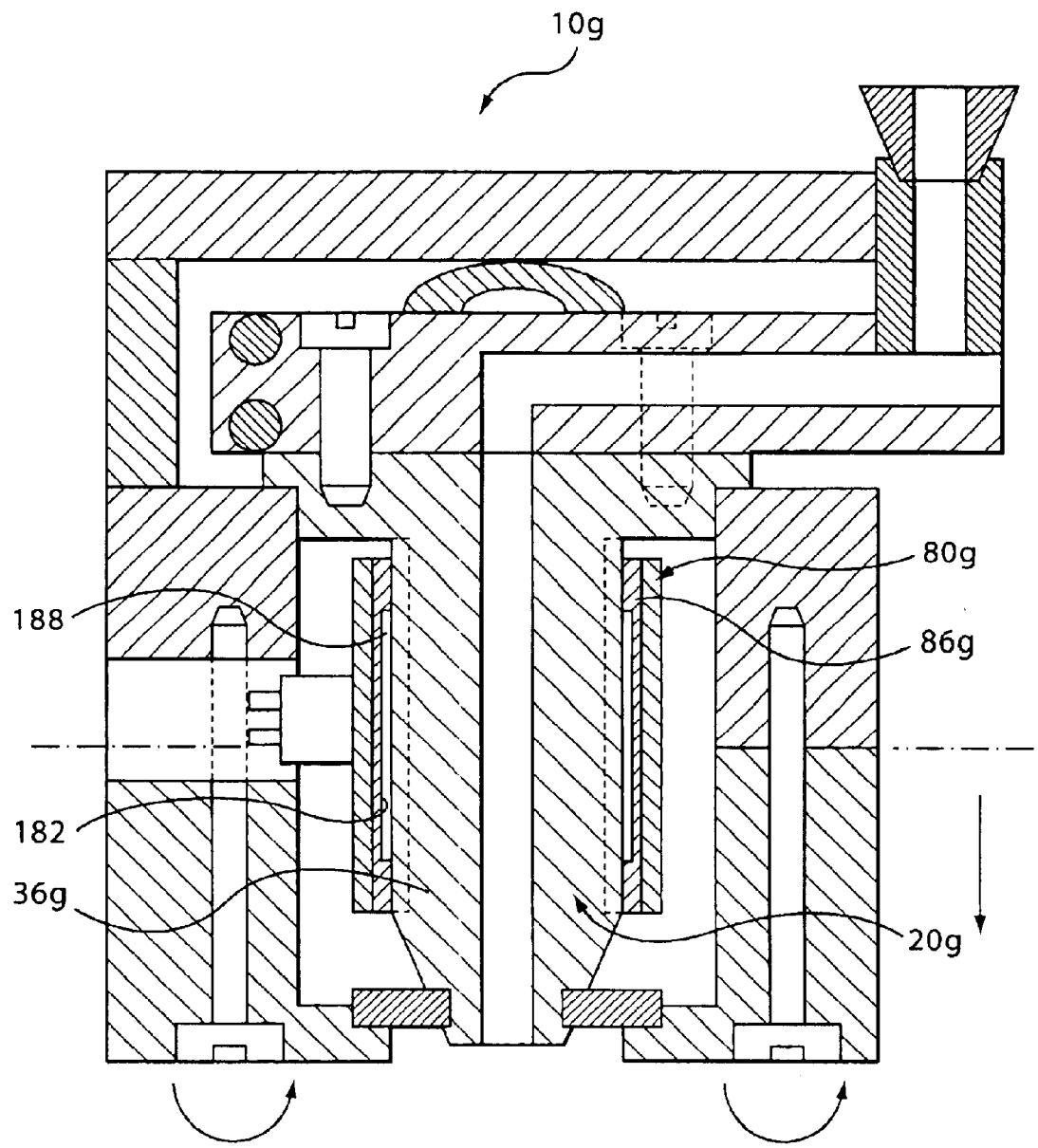
FIG. 23 is a side sectional view of an injection molding apparatus including a removable heater assembly according to another embodiment of the present invention.

Referring to FIG. 23, another embodiment of a heater assembly 80g according to the present invention is shown. The injection molding apparatus 10g is similar to the injection molding apparatus of FIG. 2 and thus will not be described further. The heater assembly 80g includes a heater sleeve 86g having an annular groove 182. The annular groove 182 provides an air gap 188 between the heater sleeve 86g and the nozzle 20g. The air gap 188 insulates the nozzle 20g along a predetermined length to profile the heat along the nozzle 20g. Heat is only directly transferred to the nozzle 20g where the heater sleeve 86g contacts the nozzle 20g. In this arrangement, the amount heat transferred to the nozzle 20g at various points along the nozzle body 36g can be controlled.

It will be appreciated that any of the heater sleeves described previously may be provided with the annular groove 182. It will further be appreciated that the heater sleeve 86g may be used in any of the previously described heater assembly embodiments.

Although preferred embodiments of the present invention have been described, those of skill in the art will appreciate that variations and modifications may be made without departing from the spirit and scope thereof as defined by the appended claims.

We claim:

1. An injection molding apparatus comprising:

a manifold having a manifold channel for receiving a melt stream of moldable material under pressure, said manifold channel for delivering the melt stream to a nozzle channel of a nozzle;

a mold cavity receiving said melt stream from said nozzle, said nozzle channel communicating with said mold cavity through a mold gate;

a heater assembly provided on said nozzle for heating said melt stream of moldable material, said heater assembly having a threaded inner surface for engaging a threaded outer surface of said nozzle; and wherein heat is transferred from said heater assembly to said nozzle through contact between threads of the heater assembly and threads of the nozzle.

2. An injection molding apparatus as claimed in claim 1, wherein said heater assembly further comprises a heater sleeve having a threaded inner surface and a heating element is coupled to said heater sleeve.

3. An injection molding apparatus as claimed in claim 2, wherein said heater assembly further comprises a lock nut located adjacent said heater sleeve to abut said heater sleeve and force said threads of said heater sleeve into engagement with said threads of said outer surface of said nozzle.

4. An injection molding apparatus as claimed in claim 3, wherein said heater assembly further comprises a spring, said spring being in contact with said heater sleeve to further force said threads of said heater sleeve into engagement with said threads of said outer surface of said nozzle.

5. An injection molding apparatus as claimed in claim 4, wherein said spring is located between said lock nut and said heater sleeve to force a leading surface of said threads of said heater sleeve into engagement with said threads of said outer surface of said nozzle.

6. An injection molding apparatus as claimed in claim 2, wherein a spring is located between said heater sleeve and a head of said nozzle to force a trailing surface of said threads of said heater sleeve into engagement with said threads of said outer surface of said nozzle.

7. An injection molding apparatus as claimed in claim 2, wherein said heating element is electrically powered.

8. An injection molding apparatus as claimed in claim 7, wherein said heating element is selected from the group comprising embedded coiled heating elements, film heating elements, cartridge heating elements and induction heating elements.

9. An injection molding apparatus as claimed in claim 8, wherein said embedded coiled heating elements are cast into said heater sleeve.

10. An injection molding apparatus as claimed in claim 9, wherein said embedded coiled heating elements are brazed into an outer surface of said heating element.

11. A heater assembly for an injection molding apparatus, said heater assembly comprising:

a heater sleeve having a threaded inner surface for engaging a threaded outer surface of a nozzle body of an injection nozzle;

a lock nut located adjacent said heater sleeve, said lock nut for selectively engaging said threaded outer surface of said nozzle body; and wherein lock nut abuts said heater sleeve and forces said threaded inner surface of said heat sleeve into contact with said threaded outer surface of said nozzle body independent of temperature variations of said heater sleeve.

12. A heater assembly as claimed in claim 11, further comprising a spring surrounding said nozzle and abutting said heater sleeve, said spring increasing the amount of contact between threads of said heater sleeve and threads of said outer surface of said nozzle.

13. An injection nozzle comprising:

a nozzle body having a nozzle channel extending therethrough, said nozzle body having a first engaging surface having a first threaded profile;

a heater provided on said nozzle body for heating a melt stream of moldable material, said heater having a second engaging surface having a second threaded profile;

wherein said heater and said nozzle body are coupled together by the interaction of said first profile and said second profile.

14. An injection nozzle comprising:

a nozzle body having a nozzle channel extending therethrough, said nozzle body having a first engaging surface having a first profile;

a heater provided on said nozzle body for heating a melt stream of moldable material, said heater having a second engaging surface having a second profile, wherein said first profile and said second profile are mating grooves;

wherein said heater and said nozzle body are coupled together by the interaction of said first profile an said second profile.

15. An injection molding apparatus comprising:

a manifold having a manifold channel for receiving a melt stream of moldable material under pressure, said manifold channel for delivering the melt stream to a mold cavity;

an injection nozzle having a nozzle body and a nozzle channel, said nozzle body having a first engaging surface having a first, non-linear profile;

a heater provided on said nozzle body for heating said melt stream of moldable material, said heater having a second engaging surface having a second non-linear profile; and wherein heat is transferred from said heater assembly to said nozzle through contact between said first profile and said second profile.

16. The injection nozzle of claim 15, wherein said first profile and said second profile are threads.

17. The injection nozzle of claim 15, wherein said first profile and said second profile are mating grooves.

18. An injection molding apparatus comprising:

a manifold having a manifold channel for receiving a melt stream of moldable material under pressure, said manifold channel for delivering the melt stream to a nozzle channel of a nozzle;

a mold cavity receiving said melt stream from said nozzle, said nozzle channel communicating with said mold cavity through a mold gate; and a heater assembly provided on said nozzle for heating said melt stream of moldable material, said heater assembly having a threaded inner surface for engaging a threaded outer surface of said nozzle.

19. The injection molding apparatus of claim 18, wherein contact is maintained between the threaded inner surface of the heater assembly and the threaded outer surface of the nozzle independent of temperature.

20. An injection molding apparatus comprising:

a manifold having at least one tubular manifold shaft, said manifold shaft having a manifold channel for receiving a melt stream of moldable material under pressure, said manifold channel for delivering the melt stream to a nozzle channel of an injection nozzle;

a mold cavity receiving said melt stream from said nozzle, said nozzle channel communicating with said mold cavity through a mold gate; and a heater assembly provided on said manifold shaft for heating said melt stream of moldable material, said heater assembly having a threaded inner surface for engaging a threaded outer surface of said manifold shaft.

* * * * *